United States Patent [19]

Haemmerle et al.

[11] 3,873,276

[45] Mar. 25, 1975

[54] ORGANIC COMPOUNDS FOR USE AS ADDITIVES FOR MOTOR-FUELS

[75] Inventors: Bernard Haemmerle; Bernard Sillion; Gabriel De Gaudemaris, all of Grenoble, France

[73] Assignees: Institut Francais du Petrole, des Carburants, et Lubrifiants, France; Entreprise de Recherches et d'Activities Petrolieres, Rueil-Malmaison, France

[22] Filed: Aug. 30, 1973

[21] Appl. No.: 393,035

Related U.S. Application Data

[63] Continuation-in-part of Ser. No. 107,861, Jan. 19, 1970, Pat. No. 3,804,852.

[30] Foreign Application Priority Data

Jan. 21, 1970 France .......................... 70.02200

[52] U.S. Cl. .................. 44/63, 44/DIG. 1, 44/71, 44/72, 44/DIG. 4, 252/392
[51] Int. Cl. .................................................. C10l 1/26
[58] Field of Search ............. 44/63, DIG. 1, DIG. 4, 44/71, 72; 252/392

[56] References Cited
UNITED STATES PATENTS

| | | | |
|---|---|---|---|
| 2,863,904 | 12/1958 | Cantrell | 44/DIG. 1 |
| 2,982,634 | 5/1961 | Nygaard | 44/DIG. 1 |
| 3,795,495 | 3/1974 | Howland et al. | 44/DIG. 1 |

*Primary Examiner*—Daniel E. Wyman
*Assistant Examiner*—Mrs. Y. H. Smith
*Attorney, Agent, or Firm*—Millen, Raptes & White

[57] ABSTRACT

New organic compounds useful as additives for motor-fuels are of the formula

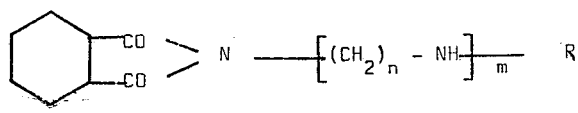

wherein the divalent hydrocarbon ring is o-phenylene, 1,2-dihydro o-phenylene, 1,2,3,6-tetrahydro o-phenylene, 3,6-andomethylene-1,2,3,6-tetrahydro o-phenylene, 3,6-endodimethylene-1,2,3,6-tetrahydro o-phenylene, cyclohexylene-1,2,3,6-endomethylene-cyclohexylene-1,2, substituted, or not, with 1–4 monovalent aliphatic hydrocarbon radicals having, as a whole, 1–30 carbon atoms, n is an integer from 2 to 10 inclusive, m an integer from 1 to 10 inclusive and R is a monovalent aliphatic hydrocarbon radical having 1–30 carbon atoms.

18 Claims, No Drawings

ORGANIC COMPOUNDS FOR USE AS ADDITIVES FOR MOTOR-FUELS

CROSS REFERENCE TO RELATED APPLICATION

This application is a continuation-in-part of our copending application Ser. No. 107,861 filed Jan. 19, 1970, now U.S. Pat. No. 3,804,852.

This invention relates to new organic compounds, which can be used as additives for motor-fuel compositions.

It is a particular object of the invention to provide new imide compounds as well as the products obtained by neutralization, either partial or total, of said compounds by means of alkylphosphoric acids.

The invention has also as particular object the use of these new compounds and their neutralization products as additives having a detergent, anti-frost and anit-corrosion action in motor-fuel compositions, and particularly in those which are used in spark ignited engines.

A further object of the invention is the use of the new imide compounds in association with mineral oils, as additives for motor-fuel compositions, the latter additive compounds exhibiting, in addition to the already mentioned detergent, anti-frost and anti-corrosion properties, good cleaning properties.

It is a further particular object of the invention to provide motor-fuel compositions containing at least one of the above-described additives.

It is known that the use of motor-fuels of the gasoline type, particularly in motor-cars, is associated with several carburetion problems. Thus, it is known that the formation, on the different parts of the carburetor, of substantial deposits, responsible for misfirings and stallings of the motor, occurs frequently in motor-cars, particularly during town traffic and/or by hot weather.

This deposit formation is still increased by the use of devices for the suction of the gases of the crankcase known as "Positive Crankcase Ventilation" (P.C.V.), used to reduce atmospheric pollution.

It is known, besides, that under certain hygrometric and temperature conditions, ice crystals appear on the metal walls of the carburetor onto which they adhere. They may accumulate there in a substantial amount such as to obstruct the admission port at the level of the throttle valve of the carburetor. It is known finally, that the water dissolved in the gasoline, may corrode the engine metal parts.

By gasoline it is intended to mean hydrocarbon motor-fuels for spark-ignited engines, having a boiling range essentially between 30° and 200°C.

Attempts have been made for reducing these disadvantages by adding different additives to gasoline at generally low concentrations (about 50 parts per million of parts by weight), in order to avoid the formation of deposits in the carburetor (detergent action), to prevent adherence of the ice crystals to the metal walls (anti-frost action) and to form a protective film on the various metal parts of the motor (anti-corrosion action).

For combining these various actions in a single molecule, it has been suggested to use as additives, various organic compounds comprising in their molecule, generally, one or more linear parts soluble in gasolines, as well as one or more polar parts.

There have now been discovered new organic compounds containing nitrogen which, when dissolved in motor-fuels, exhibit improved properties with respect to the detergent, anti-frost and anti-corrosion effects, as above-mentioned, as well as other advantages which will appear from the following description:

The compounds of the present invention have the following formula:

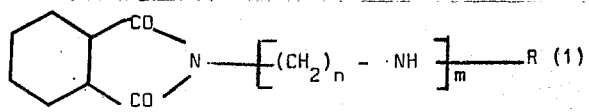

wherein the divalent hydrocarbon ring is selected from the group consisting of o-phenylene, 1,2-dihydro o-phenylene, 1,2,3,6-tetrahydro o-phenylene, 3,6-endomethylene-1,2,3,6 tetrahydro o-phenylene, 3,6-endodimethylene-1,2,3,6 tetrahydro o-phenylene, cyclohexylene-1,2, 3,6-endomethylene-cyclohexylene-1,2,3,6-endodimethylene-cyclohexylene-1,2, substituted, or not, with 1–4 monovalent aliphatic hydrocarbon radicals having, as a whole, 1–30 carbon atoms, $n$ is an integer from 2 to 10 inclusive, $m$ an integer from 0 to 10 inclusive and R is a linear or branched, saturated or unsaturated, monovalent hydrocarbon radical having 1–30 carbon atoms.

Compounds of formula (1) preferred in their use as additives for motor-fuels are those in which R is an alkyl or alkenyl radical having 12–20 carbon atoms and integer $m$ is from 1 to 5 inclusive. More particularly preferred, as the reactants for their preparation are more easily available, are compounds in which integer $n$ is 3.

Further, the hydrocarbon ring is in most cases unsubstituted or substituted with alkyl or alkenyl radicals having each 1–12 carbon atoms.

As specific examples of compounds of formula (1), there can be mentioned those wherein the hydrocarbon ring, its optional substituents, the radical R, and the numbers $n$ and $m$ are as indicated in Table I, given hereinafter.

TABLE I

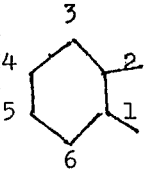

| | Substituents in position | | | | R | m | n |
|---|---|---|---|---|---|---|---|
| | 3 | 4 | 5 | 6 | | | |
| cyclohexylene | - | - | - | - | 9 octadecenyl-1 (oleyl) | 1 | 3 |
| cyclohexylene | ethyl | - | - | ethyl | octadecyl-1 (stearyl) | 1 | 3 |

TABLE I (continued)

| ⟨ring⟩ | Substituents in position | | | | R | m | r |
|---|---|---|---|---|---|---|---|
| | 3 | 4 | 5 | 6 | | | |
| phenylene | - | - | - | - | 9 octadecenyl-1 | 1 | 3 |
| phenylene | methyl | - | methyl | - | dodecyl-1 (lauryl) | 5 | 3 |
| phenylene | dodecyl | - | - | - | eicosyl-1 | 1 | 3 |
| 1,2-dihydro phenylene | methyl | - | - | - | 9 octadecenyl-1 | 1 | 3 |
| 1,2-dihydro phenylene | propyl | - | propyl | - | octadecyl-1 | 1 | 4 |
| 1,2,3,6-tetrahydro phenylene | - | - | - | - | 9 octadecenyl-1 | 1 | 10 |
| 1,2,3,6-tetrahydro phenylene | methyl | - | - | methyl | octadecyl-1 | 1 | 5 |
| 1,2,3,6-tetrahydro phenylene | butenyl | - | - | - | dodecyl-1 | 2 | 3 |
| 3,6 endomethylene cyclohexylene | - | - | - | - | 9 octadecenyl-1 | 1 | 3 |
| 3,6 endodimethylene cyclohexylene | - | methyl | methyl | - | octadecyl-1 | 1 | 4 |
| 3,6 endomethylene 1,2,3,6 tetrahydro phenylene | - | - | - | - | 9 octadecenyl-1 | 1 | 3 |
| 3,6 endomethylene 1,2,3,6 tetrahydro phenylene | - | methyl | methyl | - | octadecyl-1 | 1 | 3 |

The compounds according to the invention may be obtained for instance:

a. by the reaction of an ortho-dicarboxylic hemi-ester of the general formula:

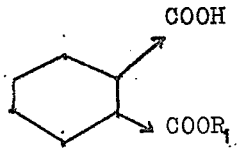　　(2)

wherein the divalent hydrocarbon ring is as defined above, $R_1$ is a linear or branched monovalent aliphatic radical containing for example 1-12 carbon atoms or a phenyl radical, optionally substituted, and the arrows indicate a possibility of isomerism.

or b. by the reaction of an anhydride of an ortho-dicarboxylic acid having the general formula:

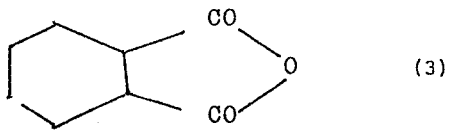　　(3)

the general characteristics of which are as defined above, with at least one aliphatic mono primary polyamine of the general formula:

　　(4)

wherein R, $n$ and $m$ are as above defined.

Examples of orthodicarboxylic compounds (hemiesters or anhydrides), which can be used are those derived from: o-phthalic, 3,5 dimethyl o-phthalic and 3-dodecyl o-phthalic acids, 1,2-dihydro o-phthalic,3-methyl 1,2-dihydro-o-phthalic and 3,5-dipropyl 1,2 dihydro o-phthalic acids, 1,2,3,6-tetrahydro o-phthalic, 3-methyl 1,2,3,6-tetrahydro o-phthalic, 3,6 endomethylene 1,2,3,6 tetrahydro o-phthalic and 3,6 endomethylene 1,2,3,6 tetrahydro o-phthalic acids 1,2-dicarboxy cyclohexane, 1,2-dicarboxy 3-ethyl cyclohexane, 1,2-dicarboxy 3,6 endodimethylene cyclohexane, 1,2-dicarboxy 3,6 endodimethylene cyclohexane, 1,2-dicarboxy 4,5-dimethyl 3,6-endodimethylene cyclohexane and 3-butenyl 1,2,3,6-tetrahydro o-phthalic acid.

Examples of mono-primary polyamines of formula (4) are: N-(dodecyl-1)-ethylenediamine, N-(9-octadecenyl-1)-ethylenediamine, N-(eicosyl-1) ethylenediamine, N-(dodecyl-1)-propylene-diamine, N-(octadecyl-1)propylenediamine, N-(eicosyl-1)-propylenediamine, similar derivatives of tetramethylene-, pentamethylene-, hexamethylene-, heptamethylene-, octamethylene-, nonamethylene- and decamethylene-diamines, and higher homologues of said amino-compounds, in which the secondary aminopolymethylene group —NH—(CH$_2$)$_n$— is repeated 2–5 times, as well as commercial products containing a major portion of one or more of said amines.

The condensation of the dicarboxylic compound on the mono-primary polyamine(s) may be carried out by the reaction of substantially equimolecular amounts of these compounds either in a dry state, or in a solvent.

There is used advantageously a solvent capable of forming an azeotrope with the water produced in the reaction. the azeotropic distillation of water insures the evolution of the reaction towards the formation of the desired imide. Among the solvents which can be used, there are partilarly mentioned: benzene, toluene and xylenes, as well as their mixtures, which have the advantage of being a part of the gasoline composition.

Moreover, it has been observed that an increase of the content of polar groups, obtained by associating alkylphosphoric acid type compounds to compounds of formula (1), results in a substantial increase of the solubility of the additive in the mixtures of aromatic solvents and improves some of the above-mentioned actions, particularly the anti-frost action.

The invention accordingly relates also to compounds resulting from the neutralization of a compound of formula (1), by at least one alkylphosphoric acid, as follows:

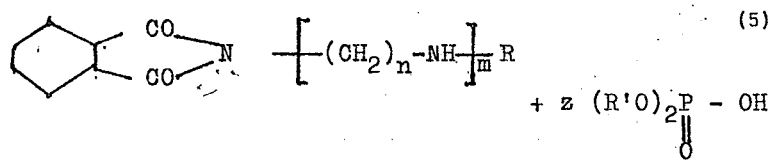
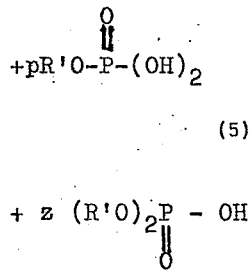

(5)

wherein the hydrocarbon ring R, $n$ and $m$ are as defined, previously, R' is a monovalent linear or branched saturated aliphatic hydrocarbon radical, preferably having from 8 to 18 carbon atoms, and $p$ and $z$ are integers so selected that the sum of the —OH groups of the acids is at most equal to the number of amino groups present in the compound of formula (1).

Among the alkyl-phosphoric acids which can be used, the mixtures of monoalkyl and dialkyl-phosphoric acids obtained by reacting phosphoric anhydride with one or more linear or branched saturated aliphatic alcohols, are particularly advantageous.

The reaction may be illustrated as follows:

$$3\ R'OH + P_2O_5 \longrightarrow (R'O)_2 POOH + (R'O)\overset{O}{\underset{\|}{P}}(OH)_2 \quad (6)$$

wherein R' as defined above.

The alcohol to be used may be selected for the purpose of obtaining a motor-fuel composition resistant to water extraction. The use of branched alcohols such as, for instance, ethylhexyl alcohol is, accordingly, preferred.

The neutralization reaction of the compound of formula (1) may be achieved by the addition of alkyl-phosphoric acid(s) to a solution of said compound in an aromatic solvent, and by maintaining the reaction mixture, for about 1 hour, at a mean temperature of from about 10° to 100°C.

According to the invention, compounds of formula (1), used as such or partially or completely neutralized by alkylphosphoric acids, are added to motor-fuel compositions for example at concentrations of from 10 to 250, preferably from 10 to 100 parts per million of parts by weight, and this without turbidity being observed in the motor-fuel, even when the addition is made at a low temperature. These compounds may be associated with the usual additives without disadvantages.

It has been discovered that compounds of formula (1), used in a motor-fuel in association with a minor amount of at least one mineral oil form moreover additives having a cleaning action. Thus, there is used, for example, from 50 to 2,000 ppm by weight of a mineral oil, such as for example, a naphthenic oil and from 10 to 250 ppm by weight of at least one compound of formula (1).

The following examples illustrate the invention.

EXAMPLE 1

A mixture of 16.3g of N-oleyl propylene diamine (0.05 mole), 7.6g of tetrahydro-o.phthalic anhydride (0.05 mole) and 60 ml of a mixture of toluene and xylene by equal parts by volume, is introduced into a three-neck flask, provided with the device of DEAN and STARK and with a thermometer.

An inert gas is bubbled therethrough. The mixture is brought to reflux for several hours until there is recovered by azeotropic distillation about 1 ml of water. The solution is cooled down and then adjusted to a known volume by means of the same mixture of solvents, so as to obtain a titrated solution of N(3-oleyl-amino-propyl) tetrahydro-o.phthalimide.

EXAMPLE 2

8.8g of an equimolecular mixture of mono- and dioctylphosphoric acids, which corresponds to 0.05 hydroxyl equivalent, is added to the solution prepared in example 1. The addition is carried out in such a manner that the temperature of the mixture is maintained below 65°C. The reaction mixture is then brought to about 80°C for 1 hour under stirring. There is obtained an oily product which is adjusted to a known volume by means of a mixture of toluene and xylene by equal parts by volume, so as to obtain a titrated solution.

EXAMPLE 3

A mixture comprising 7.4g of o.phthalic anhydride (0.05 mole), 16.3g of N-oleyl propylene diamine (0.05 mole) and 60 ml of a toluene-xylene mixture by equal volumes, is introduced into the device described in example 1.

The solution is brought to reflux until there is recovered about 1 ml of water. The obtained solution is then adjusted to a known volume by means of a mixture of the preceding solvents so as to obtain a titrated solution of N(3-oleylamino propyl) phthalimide.

EXAMPLE 4

8.8g of an equimolecular mixture of mono and dioctylphosphoric acids, corresponding to 0.05 hydroxyl equivalent is added to the solution prepared in example 3. The addition is carried out under such conditions that the temperature is kept below 65°C. The reaction mixture is then brought to 80°C for 1 hour under stirring. There is obtained an oily product, which is adjusted to a known volume by means of a toluene-xylene mixture by equal volumes, so as to obtain a titrated solution.

EXAMPLE 5

9.088 Kg of xylene, 7.380 Kg of a mixture having as essential components N-oleyl propanediamine and N-stearyl propanediamine (known under trade mark DINORAM-S) are introduced into a reactor of 70 liters, provided with a stirring device and a system for azeotropic entrainment.

There is added 0.1 Kg of 4,4'-dihydroxy 3,5,3',5',-tetratertiobutyl diphenylmethane.

The feed is brought to 35°–40°C so as to dissolve the DINORAM-S mixture in xylene. There is then added, stepwise, 2,960 Kg of phthalic anhydride. After the total addition of phthalic anhydride, the reaction mixture is brought to reflux and water is removed by azeotropic entrainment.

After reflux for 2 hours, the reaction is completed. 97 % of the theoretical water amount have been removed and there is thus obtained a solution of N-(3-oleyl aminopropyl) phthalimide and N-(3-stearyl amino-propyl) phthalimide. This solution has a viscosity of 6.2 cSt at 30°C. It titrates 48.2 g/ 100 cc.

The total alkalinity is 0.997 NH equivalent per gram of solution.

EXAMPLE 6

Determination of the carburetor merit.

There is used a motor of the trade mark RENAULT R16 and of the type 69-701, equipped with a Solex carburetor of the type D.I.T.A.2.

This motor, lubricated with a multigrade 20 W/40 commercial oil, is fed with a premium gasoline having the following composition by weight:

| | |
|---|---|
| aromatic hydrocarbons | 39 % |
| olefins | 4 % |
| saturated hydrocarbons | 57 % | and which contains, in addition, 0.5 g/l of lead.

The motor is run over 48 hours, while 10 to 12 % of the exhaust gases are recycled. At each test the consumption of premium gasoline is about 200 liters.

For each test, there is used a new carburetor (thus of a merit equal to 10).

The carburetor is disassembled at the end of the test and its merit is evaluated.

In the following table, the results of the tests carried out with the above described premium gasoline are summarized:

1. without detergent additive
2. with 35 ppm (by weight) of the compound according to example 4.

| carbureting composition | (1) | (2) |
|---|---|---|
| carburetor merit | 6 | 8 |
| merit improvement* | — | 2 |

*The merit improvement corresponds to the difference between the merits observed with and without additive respectively.

EXAMPLES 7 to 20

In these examples, there have been also prepared imide compounds having the formula:

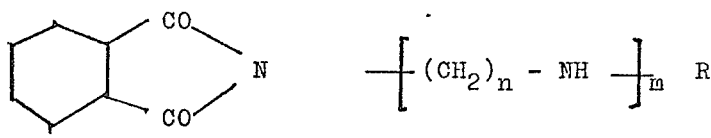

wherein the hydrocarbon ring, its optional substituents $H_4$, the numbers $n$ and $m$ and the radical R are as indicated in the following table.

| EX No | [ring] | Substituents in position 3 | 4 | 5 | 6 | R | m | n |
|---|---|---|---|---|---|---|---|---|
| 7 | cyclohexylene | - | - | - | - | 9 octadecenyl-1(oleyl) | 1 | 3 |
| 8 | cyclohexylene | ethyl | - | - | ethyl | octadecyl 1 (stearyl) | 1 | 3 |
| 9 | phenylene | - | - | - | - | 9 octadecenyl-1 | 1 | 3 |
| 10 | phenylene | methyl | - | methyl | - | dodecyl-1 (lauryl) | 5 | 3 |
| 11 | phenylene | dodecyl | - | - | - | eicosyl-1 | 1 | 3 |
| 12 | 1,2-dihydro phenylene | methyl | - | - | - | 9 octadecenyl-1 | 1 | 3 |
| 13 | 1,2-dihydro phenylene | propyl | - | propyl | - | octadecyl-1 | 1 | 4 |
| 14 | 1,2,3,6 tetrahydro phenylene | - | - | - | - | 9 octadecenyl-1 | 1 | 10 |
| 15 | 1,2,3,6 tetrahydro phenylene | methyl | - | - | methyl | octadecyl-1 | 1 | 5 |
| 16 | 1,2,3,6 tetrahydro phenylene | butenyl | - | - | - | dodecyl-1 | 2 | 3 |
| 17 | 3,6 endomethylene cyclohexylene | - | - | - | - | 9 octadecenyl-1 | 1 | 3 |
| 18 | 3,6 endodimethylene cyclohexylene | - | methyl | methyl | - | octadecyl-1 | 1 | 4 |
| 19 | 3,6 endomethylene 1,2,3,6 tetrahydro phenylene | - | - | - | - | 9 octadecenyl-1 | 1 | 3 |
| 20 | 3,6 endomethylene 1,2,3,6 tetrahydro phenylene | - | methyl | methyl | - | octadecyl-1 | 1 | 3 |

These compounds have been tested in the same manner as in example 6. The results obtained are similar to those given in this example.

From the foregoing description, one skilled in the art can easily ascertain the essential characteristics of this invention, and without departing from the spirit and scope thereof, can make various changes and modifications of the invention to adapt it to various usages and conditions.

What we claim is:

1. A fuel composition comprising a major amount of gasoline and, as an additive, a small amount of at least one member selected from the group consisting of a compound of the formula

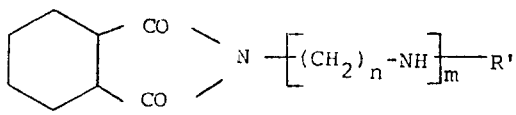

in which the divalent hydrocarbon ring is selected from the group consising of o-phenylene, 1,2-dihydro o-phenylene, 1,2,3,6-tetrahydro o-phenylene, 3,6-endomethylene-1,2,3,6 tetrahydro o-phenylene, 3,6-endodimethylene-1,2,3,6 tetrahydro o-phenylene cyclohexylene-1,2,3,6-endomethylene-cyclohexylene-1,2,3,6 endodimethylene-cyclohexylene-1,2, substituted, or not with 1–4 monovalent aliphatic hydrocarbon radicals having, as a whole, 1–30 carbon atoms, $n$ is an integer from 2 to 10 inclusive, m an integer from 0 to 10 inclusive and R is a linear or branched, saturated or unsaturated, monovalent hydrocarbon radical having 1–3 carbon atoms and a neutralization product of said compound with an amount of at least one acid compound selected from the group consisting of monoalkyl- and dialkyl-phosphoric acids of the general formulae:

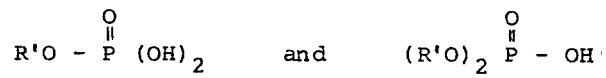

in which R' is a monovalent saturated aliphatic hydrocarbon radical having from 8 to 18 carbon atoms, corresponding to a number of OH groups not higher than the number of amino groups of said compound; said small amount of additive being in an amount effective to impart detergent, anti-frost and anti-corrosion properties to the fuel composition.

2. A fuel composition as defined by claim 1, wherein said member represents from 10 to 250 parts per million of parts by weight of said gasoline.

3. A fuel composition as defined by claim 1, wherein said member is said neutralization product.

4. A fuel composition as defined by claim 3, wherein said neutralization product represents, by weight, from 10 to 250 parts per million of parts of the gasoline.

5. A fuel composition as defined by claim 3, wherein said acid compound is a mixture of mono- and di-octyl phosphoric acids.

6. A fuel composition as defined by claim 1, further comprising a small amount of at least one mineral oil, said small amount being effective with said at least one member to impart cleaning properties to the fuel composition.

7. A fuel composition as defined by claim 6, wherein said mineral oil is a naphthenic oil.

8. A fuel composition as defined by claim 6, wherein said mineral oil represents, by weight, from 50 to 2,000 parts per million of parts of the gasoline.

9. A fuel composition as defined by claim 1, wherein in the formula of said compound R is an alkyl or alkenyl radical having 12–20 carbon atoms and integer $m$ is from 1 to 5 inclusive.

10. A fuel composition as defined by claim 9, wherein in the formula of said compound R is dodecyl-1, octadecyl-1, 9-octadecenyl-1 or eicosyl-1.

11. A fuel composition as defined by claim 1, wherein in the formula of said compound $n$ is 3.

12. A fuel composition as defined by claim 1, wherein in the formula of said compound the hydrocarbon ring is unsubstituted.

13. A fuel composition as defined by claim 1, wherein in the formula of said compound the hydrocarbon ring is substituted with 1–4 alkyl or alkenyl radicals having each 1–12 carbon atoms.

14. A fuel composition as defined by claim 13, wherein in the formula of said compound the hydrocarbon ring is substituted with at least one methyl, ethyl, propyl, butenyl or dodecyl group.

15. A fuel composition as defined by claim 1, wherein said compound is N(3-oleyl-aminopropyl)tetrahydro-o-phthalimide.

16. A fuel composition as defined by claim 1, wherein said compound is N(3-oleylamino propyl)phthalimide.

17. A fuel composition as defined by claim 1, wherein said compound is N-(3-stearyl aminopropyl)phthalimide.

18. A fuel composition as defined by claim 8, wherein said member represents from 10 to 250 parts per million of parts by weight of said gasoline.

* * * * *